United States Patent [19]

Papanu et al.

[11] 4,224,420
[45] Sep. 23, 1980

[54] PREPARATION OF POLYMERIC ACETAL CARBOXYLATES USING MOLECULAR SIEVES

[75] Inventors: Victor D. Papanu, Maryland Heights; Charles J. Upton, Ballwin, both of Mo.

[73] Assignee: Monsanto Company, St. Louis, Mo.

[21] Appl. No.: 49,991

[22] Filed: Jun. 18, 1979

[51] Int. Cl.$^2$ .................... C08F 283/06; C08G 6/00
[52] U.S. Cl. .................................. 525/401; 528/230; 528/245; 528/246; 528/494
[58] Field of Search ............... 528/230, 245, 246, 494; 525/398, 401

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

*Primary Examiner*—Lucille M. Phynes
*Attorney, Agent, or Firm*—S. M. Tarter; W. H. Duffey; F. D. Shearin

[57] ABSTRACT

The alkali metal, ammonium and alkanol ammonium salts of polymeric acetal carboxylates are stable detergent builders under laundry use conditions but depolymerize in acid media, making the polymer fragments more readily biodegradable in waste streams. Such polymeric acetal carboxylates can now be made by a process which comprises bringing together in a reaction zone under polymerization conditions an ester of glyoxylic acid and a molecular sieve, and adding an alkyl vinyl ether to the resulting polymer in the presence of the molecular sieve to stabilize the polymer against rapid depolymerization in alkaline solution. The preferred alkyl vinyl ether is ethyl vinyl ether.

16 Claims, No Drawings

PREPARATION OF POLYMERIC ACETAL CARBOXYLATES USING MOLECULAR SIEVES

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPp in detergent compositions. The composition of such polymeric acetal carboxylates has been disclosed in U.S. Pat. No. 4,144,226 issued Mar. 13, 1979 and in Ser. No. 962,512 filed Nov. 20, 1978. The use of such polymeric acetal carboxylates in detergent compositions is disclosed in U.S. Pat. No. 4,146,495 issued Mar. 27, 1979. A preferred method for the saponification of the esters of the polymeric acetal carboxylates to form the corresponding alkali metal salts is disclosed in U.S. Pat. No. 4,140,676 issued Feb. 20, 1979. The polymeric acetal carboxylate salts described in the above applications and patents were tested for sequestration function using the procedures described by Matzner et al in "Organic Builder Salts as Replacements for Sodium Tripolyphosphate", TENSIDE, 10, No. 3, pages 119-125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing the polymeric acetal carboxylates disclosed in the above patents and patent applications are satisfactory, there is a need for improved processes to prepare such materials to achieve greater efficiencies by lowering the number of processing steps. Now, according to the present invention, an improved process for preparing the polymeric acetal carboxylates has been developed which permits the monomer to be polymerized and by using the same catalyst to add to the polymer termini an end group which will stabilize the polymer against rapid depolymerization in alkaline solution.

SUMMARY OF THE INVENTION

These and other advantages are achieved by process which comprises:
(a) bringing together in a reaction zone under polymerization conditions an ester of glyoxylic acid and a molecular sieve, and
(b) adding to the reaction zone an alkyl vinyl ether containing 3 to about 20 carbon atoms to the resulting polymer in the presence of the molecular sieve to stabilize the polymer against rapid depolymerization in alkaline solution.

For the purposes of this invention, the term "rapid depolymerization in alkaline solution" as it is used in the specification and claims, shall mean that in an aqueous solution of 0.5 molar sodium hydroxide containing 10 grams per liter of the polymer of the present invention, the average chain length of the polymer will be reduced by more than 50 percent, as determined by Proton Magnetic Resonance, after 1 hour at 20° C.

Broadly described, the polymeric acetal carboxylates can be prepared by the present process by bringing together in a reaction zone under polymerization conditions an ester of glyoxylic acid and a molecular sieve, and optionally one or more comonomers, to form a polymer believed to have the following empirical formula:

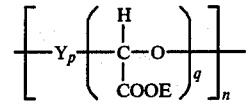

wherein Y is one or more comonomers randomly distributed along the polymer chain selected from the group consisting of alkylene oxides and aldehydes having up to 20 carbon atoms; n averages at least 4; p is 0 to an average of about 5; q is at least 1; and E is an alkyl group having 1 to about 4 carbon atoms. Thereafter, there is added an alkyl vinyl ether to the resulting polymer in the presence of the molecular sieve to provide a chemically stable end group derived from the alkyl vinyl ether, which stabilizes the polymer against rapid depolymerization in alkaline solution. Thereafter, the polymeric ester is saponified to the corresponding polymeric alkali metal salt by contacting the polymeric ester with an alkali metal hydroxide.

Any number of esters of glyoxylic acid can be used as one starting material to prepare the polymeric acetal carboxylates. The hemiacetal form of the esters can be made by the reaction of an alcohol containing from 1 to 4 carbon atoms with an acid hemiacetal or acid hydrate under conditions known to those skilled in the art. Suitable esters include those having from 1 to about 4 carbon atoms in the alkoxy group, such as methyl, ethyl, propyl, isopropyl, butyl, isobutyl and the like. Other esters of glyoxylic acid can also be used, provided that the particular ester does not interfere with the polymerization, cause the polymer of the present invention to undergo rapid depolymerization in alkaline solution, or interfere with the intended function of the polymer as a chelant, sequestrant or detergent builder, and such esters of glyoxylate are equivalent for purposes of this invention. Methyl and ethyl esters are preferred. Thereafter, the resulting ester hemiacetal can be converted to the corresponding aldehyde ester by any number of techniques known to those skilled in the art, such as the reaction of the ester hemiacetal with phosphorus pentoxide according to the following general equation:

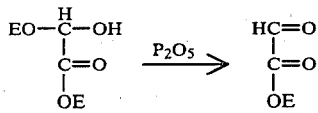

where E is an alkyl group having 1 to 4 carbon atoms.

Any number of comonomers known to those skilled in the art optionally can be copolymerized with the aldehyde ester to form a polymer of the present invention. It is only necessary that the comonomer does not inhibit polymerization or cause the polymer of the present invention to undergo rapid depolymerization in alkaline solution. Suitable comonomers include: alkylene oxides, such as ethylene oxide, propylene oxide, epihalohydrin, epoxysuccinate and the like; aldehydes such as formaldehyde, acetaldehyde, as well as aldehydes containing up to 20 carbon atoms, and the like. Comonomers having from 1 to 4 carbon atoms, such as ethylene oxide, formaldehyde or acetaldehyde are preferred.

Mixtures of comonomers can be polymerized with the aldehyde ester to form a terpolymer, or even a more complex polymeric structure. For example, mixtures of the same class of comonomers, such as a mixture of epoxy compounds like ethylene oxide and propylene oxide, can be copolymerized with the aldehyde ester to form a terpolymer. Numerous other examples will occur to those skilled in the art in view of the present disclosure, such as a mixture of ethylene oxide and formaldehyde.

The number of carboxylate groups in the polymer product of the present invention is important since the number of carboxylate groups affects the usefulness of the corresponding polymer salt as a chelant, sequestrant and detergent builder. Hence, the nature of the comonomer or comonomers (i.e., the nature of Y), the mole ratio of comonomer to aldehyde ester (i.e., the ratio of p and q) and the number of repeating units in the polymer of the present invention (i.e., the average value of n) are each interrelated and important since they affect the number of carboxylate groups in the polymer.

Although there is theoretically no upper limit to the ratio of the moles of comonomer or comonomers to the moles of acetal carboxylate segments in the polymer, when the mole ratio of acetal carboxylate segments to comonomer is less than about 1:5 (i.e., q is 1 and p averages about 5), the polymer salt loses much of its effectiveness as a chelant, sequestrant and detergent builder. It is preferred that the mole ratio of acetal carboxylate to comonomer is at least about 1:2, more preferably at least about 1:1 (i.e., p and q are each about 1) or higher, say 5:1 or even 50:1 (i.e., p is 1 and q is at least about 5, say 50). Of course, the polymer salt is most effective as a chelant, sequestrant and detergent builder when a comonomer is not present, i.e., when p equals 0. On the other hand, the comonomers can frequently provide special properties to the polymer, e.g., improved biodegradability. Thus, when a comonomer is desirable, a relatively small comonomer that does not disperse the acetal carboxylate groups too widely or inhibit chelation by steric hindrance, such as ethylene oxide or formaldehyde, is preferred.

The number of repeating units, i.e., the average value of n, in the polymer is also important, since the effectiveness of the polymer salt as a chelant, sequestrant and detergency builder is affected by the average chain length. Even when the polymer averages only four repeating units (i.e., n averages 4), the polymer shows some effectiveness as a sequestrant, chelating agent and builder. Although there is no theoretical limit to the number of repeating units, which can average as high as 400, or even higher, there does not seem to be an advantage to having a polymer with an average of more than about 200 repeating units. When the average number of repeating units exceeds about 100, significant improvement in sequestration, chelation and builder properties is not observed. Thus, it is preferred that the polymer contain an average between about 10 and about 200 units, and even more preferred that the polymer contains an average between about 50 and about 100 repeating units in the chain.

Some important factors believed to control the chain length of the polymer include: (1) the initiator concentration, (2) the temperature of the polymerization, (3) the purity of the starting materials, and (4) the presence of solvents and their levels. As will occur to those skilled in the art, these factors are all interrelated and the desired chain length can easily be controlled by simple experimentation by controlling these variables.

It was surprisingly found that molecular sieves could be used to initiate the polymerization, and also, as a catalyst to add chemically stable groups to the polymer to stabilize the polymer against rapid depolymerization in alkaline solution. As is known to those skilled in the art, molecular sieves are zeolites (alkali metal alumino silicates), having an open network structure commonly used to separate mixtures by selective occlusion of one or more of the constituents, e.g., methane, from isoparaffins. The size of the open network is commonly measured in angstrom units (A) and it is common to identify particular molecular sieves as 3A molecular sieves, 7A molecular sieves, etc., meaning that the particular molecular sieve has an open network structure 3 angstroms in diameter or 7 angstroms in diameter, respectively. Molecular sieves having an open network structure between 1 angstrom and 10 angstroms, or even larger or smaller, provide satisfactory results in the process of the present invention, but it is preferred to use molecular sieves having an open network structure between about 2 angstroms and 5 angstroms, say about 3 angstroms.

The process of the present invention can be conducted as a batch process wherein the aldehyde ester is polymerized in a reaction zone and the resulting polymer is stabilized against rapid depolymerization in alkaline solution by adding alkyl vinyl ether to the reaction zone. Alternatively, the process can be conducted semicontinuously, for example, by using a series of batch steps, e.g., polymerization, stabilization and saponification. On the other hand, the process can be carried out continuously. It is only necessary to bring the aldehyde ester together with the molecular sieve, with or without a comonomer, and thereafter, add the alkyl vinyl ether to the resulting polymer and the molecular sieve to stabilize the polymer against rapid depolymerization in alkaline solution.

The polymerization conditions can vary within wide limits. The temperature at the beginning of polymerization can vary between about −70° C. to about 50° C., although satisfactory results are obtained between 0° C. and about 20° C. The temperature rise after the polymerization is initiated is not critical, although it is preferred to prevent a temperature rise of more than about 50° C. Satisfactory results are obtained at atmospheric pressure although higher or lower pressures could be used.

The amount of molecular sieve to be used for polymerization and as a catalyst to add the alkyl vinyl ether to the polymer termini, according to the process of the present invention, can also vary within wide limits. It is only necessary that there is a sufficient amount of molecular sieve, under the conditions of the process steps, to initiate the polymerization of the aldehyde ester and to act as a catalyst to add the alkyl vinyl ether to the resulting polymer. On the other hand, there is no advantage to using an excessive amount of molecular sieve. Satisfactory results can be achieved using from about 0.1 to about 5 grams of molecular sieve per mole of monomer, for example, about 1 gram of molecular sieve per mole of monomer.

According to the process of the present invention, after the aldehyde ester has been polymerized, with or without a comonomer as discussed above, a sufficient amount of an alkyl vinyl ether is added to the resulting polymer and the molecular sieve to stabilize the polymer against rapid depolymerization in an alkaline solution.

The conditions of temperature and pressure under which the alkyl vinyl ether is added to the polymer and the molecular sieve are substantially the same as the conditions for polymerization of the aldehyde ester.

The amount of alkyl vinyl ether to provide a chemically stable end group at the polymer termini can vary within wide limits. For example, from 1 to about 4 alkyl vinyl ether units can be added at each end of the polymer to stabilize the polymer against rapid depolymerization in alkaline solution. The number of alkyl vinyl ether units that can be added at the polymer termini depends on a number of factors, as will occur to those skilled in the art in view of the present disclosure, such as the purity of the reactants, the quantity of alkyl vinyl ether present, the temperature and the like. More than 4 alkyl vinyl ether units can be added to each end of the polymer by carefully controlling the conditions, but additional stabilization is not achieved by a long chain of alkyl vinyl ether units at each end of the polymer. It is preferred to have less than 4 alkyl vinyl ether units at the polymer end, say 1 to 3 units of vinyl ether. At least one chemically stable group derived from the alkyl vinyl ether is necessary at each polymer end to insure that the polymer is stabilized against rapid depolymerization in an alkaline solution.

Suitable alkyl vinyl ethers include methyl vinyl ether, ethyl vinyl ether, propyl vinyl ether, isopropyl vinyl ether, isobutyl vinyl ether and the like. Even vinyl ethers having up to 20 carbon atoms in the alkyl chain, such as octadecyl vinyl ether, can be used although it is preferred to use alkyl vinyl ethers having up to about 6 carbon atoms, such as the methyl, ethyl or propyl vinyl ethers.

The stabilized polymer ester is useful as an intermediate to prepare the corresponding alkali metal, ammonium or alkanol amine salts. It is only necessary to saponify the stabilized polymer ester with a base, such as lithium hydroxide, sodium hydroxide, potassium hydroxide and the like, using conventional saponification techniques to make a salt suitable for use as a builder and as a sequestrant. The ammonium or alkanol amine salts can be prepared from the corresponding alkali metal salts using conventional ion exchange techniques.

After the polymer ester is saponified to the corresponding alkali metal salt, the residual molecular sieve optionally can be separated from the polymer salt by dissolving the polymer salt in an alkaline solution and separating the molecular sieve by filtration, decantation, centrifugation and the like. However, the presence of the molecular sieve in the polymer salt does not affect the performance of the polymer salt as a chelant, sequestrant and detergent builder. If only small amounts of the molecular sieve remain with the polymer salt, it is preferred to leave it admixed with the polymer salt.

The amount of polymer salt required to effectively complex the ions in a given system will depend to some extent on the particular polymer salt being used and the particular metal ion in the aqueous media. Because the polymer tends to depolymerize in acid media, effective complexing is limited to neutral or preferably basic solution. Optimum conditions and amounts of the polymer salt to be used can readily be determined by routine experimentation.

The polymer salts are also useful as builders in detergent formulations. Since the pH of the detergent solution is usually between pH 9 and pH 10, the polymer salts will not depolymerize rapidly when used as a detergent builder in aqueous solution at normal use concentrations (about 1200–1500 ppm formulation in the wash water), temperatures (10°–60° C.) and times (i.e., about 15 minutes) typical of United States home laundry practices. Generally, the use of the alkali metal salts, particularly the sodium salt, is preferred. However, in some formulations where greater builder solubility is required, the use of ammonium or alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordance with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous ester aldehyde useful to prepare the polymers of the present invention.

A 2-liter, 4-necked, round bottom flask equipped with an overhead stirrer, thermometer and 30 centimeter Vigreaux column and take-off head, is charged with 1200 grams (10 moles) of methyl glyoxylate methyl hemiacetal. A total of 568 grams of phosphorus pentoxide (4 moles) is added in 4-6 portions, keeping the reaction temperature below 90° C. The addition requires about 90 minutes. When the addition is complete, the mixture is stirred until the temperature has fallen to about 70° C. (0.5 hour). The mixture is distilled at aspirator vacuum (20-40 torr) yielding 764 grams crude methyl glyoxylate having a boiling point of 56°-61° C.; the distillation is stopped when the pot temperature reaches 125° C. Chromatographic analysis of this crude material indicates 86.6 percent glyoxylate, 9.3 percent methyl dimethoxyacetate, 3.3 percent dimethyl oxalate and trace amounts of unidentified products.

The crude product is then distilled from 25 grams of 3A molecular sieves (which had been heated to about 125° C. to drive off residual moisture and organics) through the Vigreaux column. A 15-gram forecut of about 97 percent pure glyoxylate is collected initially. The Vigreaux column is replaced by a 30.5 centimeter Widmer column and 521 grams of 99 percent pure polymerizable grade methyl glyoxylate is collected having a boiling point of 83°-84° C. at 210 torr. A final cut of 36 grams (93 percent pure) ester is collected in a final fraction (25°-91° C.; 210 torr). The overall yield of polymerizable glyoxylate is 59 percent from the hemiacetal.

The polymerizable glyoxylate is stored in a glass-stoppered bottle at −70° C. until ready for use.

EXAMPLE II

To a 50 milliliter 3-necked flask equipped with a mechanical stirrer and thermometer is added 10 grams (0.11 mol) of freshly distilled ester aldehyde from Example I and 4 milliliters of methylene chloride. The temperature of the flask and the contents is lowered to about 0° C. by cooling in an ice bath and polymerization initiated by the addition of 0.1 gram of 3A molecular sieve whick has been heated to about 150° C. to drive off residual moisture and organics. Polymerization is rapid and exothermic. The flask is kept in the ice bath and when the temperature returns to about 20° C., 3.5 milliliters of ethyl vinyl ether is added to the mixture. The mixture is stirred at room temperature overnight.

Then, 15 milliliters of toluene are added and the mixture vigorously stirred for 10 minutes. The upper solvent layer is removed by decantation and the washing repeated with a second 10 milliliter portion of toluene. After the second portion is decanted, the ester polymer is treated with 10 milliliters of 0.1 molar sodium hydroxide to remove unreacted monomer and polymer that is not stabilized against rapid depolymerization in alkaline solution. After stirring for 20 minutes, the aqueous layer is decanted.

The ester polymer is then saponified with 10 milliliters of 10 molar sodium hydroxide. The sodium hydroxide is added in portions while the reaction mixture is cooled in ice to keep the temperature of the mixture below about 45° C. The addition of the sodium hydroxide requires about 30 minutes and the mixture is stirred an additional 90 minutes to insure complete reaction.

Then, 30 milliliters of methanol is added to facilitate filtration and the polymeric sodium salt is filtered on a sintered glass funnel and washed with methanol and diethyl ether. Vacuum drying overnight at 150° C. and 2-3 milliliters mercury leaves about 3 grams (about 20 percent yield) of a white solid product.

Analysis of the product, including the chain length, reveals that the while solid has the following empirical formula:

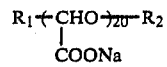

where $R_1$ and $R_2$ are end groups derived from ethyl vinyl ether.

EXAMPLE III

A sample of the polymer salt from Example II is tested for sequestration function using the procedure described by Matzner et al, "Organic Builder Salts as Replacements for Sodium Tripolyphosphate", TENSIDE, 10, No. 3, pages 119-125 (1973). The sequestration of calcium ions and magnesium ions as a percent of STPP performance shows that the polymer salt is about 114 percent of STPP.

EXAMPLE IV

The biodegradation of the polymer salt from Example II is measured by diluting 1 part of an activated sewerage sludge with about 10 parts of river water and adding a known amount of the polymer to the diluted sludge. The carbon dioxide evolution from the diluted sludge is used to determine biodegradation. After 4 weeks, 78 percent of the theoretical amount of carbon dioxide is evolved.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process which comprises:
    (a) bringing together in a reaction zone under polymerization conditions an ester of glyoxylic acid and a molecular sieve; and
    (b) adding an alkyl vinyl ether containing 3 to about 18 carbon atoms to the resulting polymer in the presence of the molecular sieve to stabilize the polymer against rapid depolymerization in alkaline solution.

2. A process of claim 1 wherein the alkyl vinyl ether contains 3 to about 6 carbon atoms.

3. A process of claim 1 wherein the alkyl vinyl ether is ethyl vinyl ether.

4. A process of claim 1 or 2 wherein the molecular sieve is a 3A molecular sieve.

5. A process of claim 1 wherein the stabilized polymer ester is saponified to the corresponding alkali metal salt.

6. A process of claim 1 wherein the stabilized polymer ester is saponified to the corresponding sodium salt.

7. A process of claim 1 wherein the alkyl vinyl ether contains 3 to about 6 carbon atoms and the molecular sieve is a 3A molecular sieve.

8. A process of claim 7 wherein the alkyl vinyl ether is ethyl vinyl ether.

9. A process of claim 8 wherein the stabilized polymer ester is saponified to the corresponding sodium salt.

10. A process of claim 1 which comprises bringing together under polymerization conditions an ester of glyoxylic acid, at least one comonomer selected from the group consisting of alkylene oxides and aldehydes having from 1 to 20 carbon atoms, and a molecular sieve.

11. A process of claim 10 wherein the comonomer is aldehyde.

12. A process of claim 10 wherein the comonomer is formaldehyde.

13. A process of claim 10 wherein the alkyl vinyl ether contains 3 to about 6 carbon atoms.

14. A process of claim 10 wherein the alkyl vinyl ether is ethyl vinyl ether.

15. A process of claim 10 or 13 wherein the molecular sieve is a 3A molecular sieve.

16. A process of claim 10 or 13 wherein the stabilized polymer ester is saponified to the corresponding alkali metal salt.

* * * * *